(12) United States Patent
Snow, Jr.

(10) Patent No.: US 8,778,062 B1
(45) Date of Patent: Jul. 15, 2014

(54) WARMING SYSTEM FOR AIR SEPARATION MODULES

(75) Inventor: Donald Ray Snow, Jr., Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 13/327,222

(22) Filed: Dec. 15, 2011

(51) Int. Cl.
*B01D 53/02* (2006.01)
*B64D 37/00* (2006.01)
*B01D 53/22* (2006.01)

(52) U.S. Cl.
CPC ........... *B64D 37/00* (2013.01); *B01D 53/22* (2013.01); *B01D 2256/10* (2013.01); *B01D 2257/102* (2013.01)
USPC .......... 96/135; 96/4; 96/417; 96/420; 96/421; 96/422; 95/1; 95/39; 95/90

(58) Field of Classification Search
CPC ............ B01D 2257/102; B01D 2256/10; B01D 53/22; B64D 37/00
USPC ........... 95/1, 39, 90; 96/4, 135, 417, 420–422
See application file for complete search history.

(56) References Cited

U.S. PATENT DOCUMENTS

| | | | | |
|---|---|---|---|---|
| 4,378,920 | A * | 4/1983 | Runnels et al. | 244/135 R |
| 6,491,739 | B1 * | 12/2002 | Crome et al. | 95/14 |
| 6,997,013 | B2 * | 2/2006 | Jones | 62/655 |
| 7,152,635 | B2 | 12/2006 | Moravec et al. | |
| 7,204,868 | B2 | 4/2007 | Snow, Jr. | |
| 7,306,646 | B2 * | 12/2007 | Wong | 95/45 |
| 7,374,601 | B2 * | 5/2008 | Bonchonsky et al. | 95/138 |
| 2001/0035092 | A1 * | 11/2001 | Hachimaki et al. | 96/6 |
| 2004/0226438 | A1 * | 11/2004 | Jones | 95/45 |
| 2005/0115404 | A1 * | 6/2005 | Leigh et al. | 95/11 |
| 2005/0173017 | A1 * | 8/2005 | Moravec et al. | 141/66 |
| 2005/0247197 | A1 * | 11/2005 | Snow, Jr. | 95/138 |
| 2007/0144347 | A1 * | 6/2007 | Snow, Jr. | 95/138 |
| 2009/0071340 | A1 * | 3/2009 | Surawski | 96/4 |
| 2013/0081537 | A1 * | 4/2013 | Bikson et al. | 95/54 |

OTHER PUBLICATIONS

U.S. Appl. No. 61/494,867, filed Jun. 8, 2011, Theodore et al.
U.S. Appl. No. 13/324,679, filed Dec. 13, 2011, Snow, Jr. et al.
"Hollow Fiber Membrane Gas Separation for Ground-Based Inerting," University of Toledo School of Engineering, pp. 1-7, accessed Dec. 7, 2011, http://www.eng.utoledo.edu/polymer/info/Courses/LabIIHandouts/GasMembrane.pdf.

* cited by examiner

*Primary Examiner* — Christopher P Jones
(74) *Attorney, Agent, or Firm* — Yee & Associates, P.C.

(57) ABSTRACT

A method and apparatus for processing air. The apparatus comprises an air separation module, a first input, a first output, a second output, and a flow control system. The air separation module is configured to generate an inert gas. The first input for the air separation module is configured to receive first air. The first output for the air separation module is configured to output the inert gas from the air separation module. The second output for the air separation module is configured to output separated air from the air separation module. The flow control system is configured to control a flow of air in the air separation module that increases a rate at which the air separation module reaches a desired operating temperature for generating the inert gas using a number of ports in the flow control module.

17 Claims, 11 Drawing Sheets

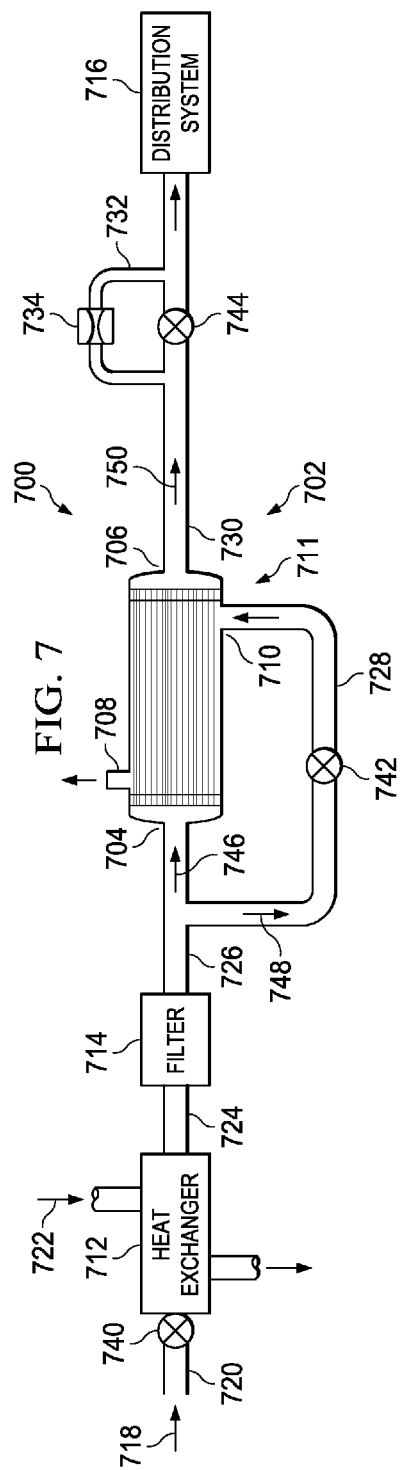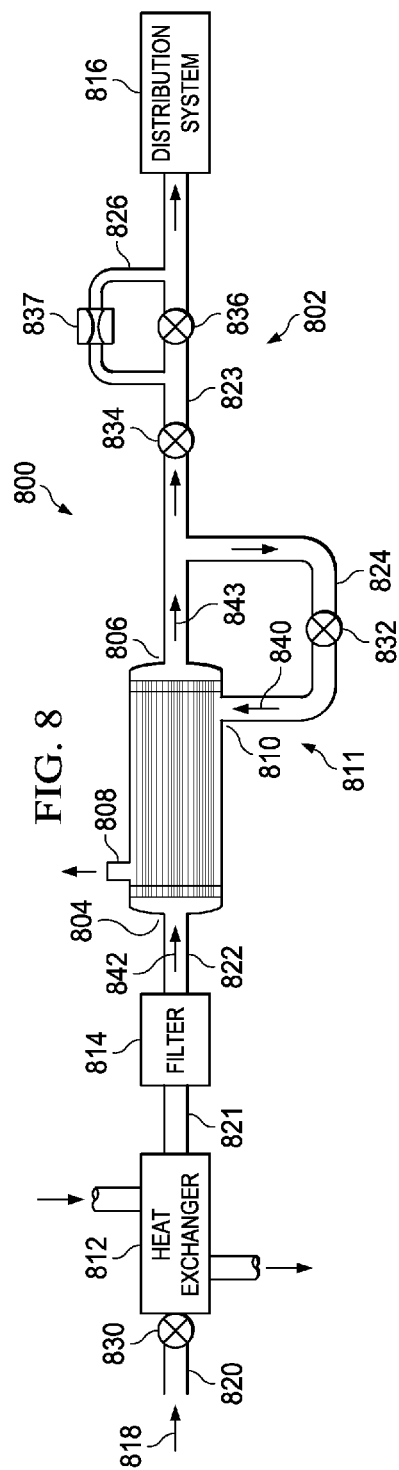

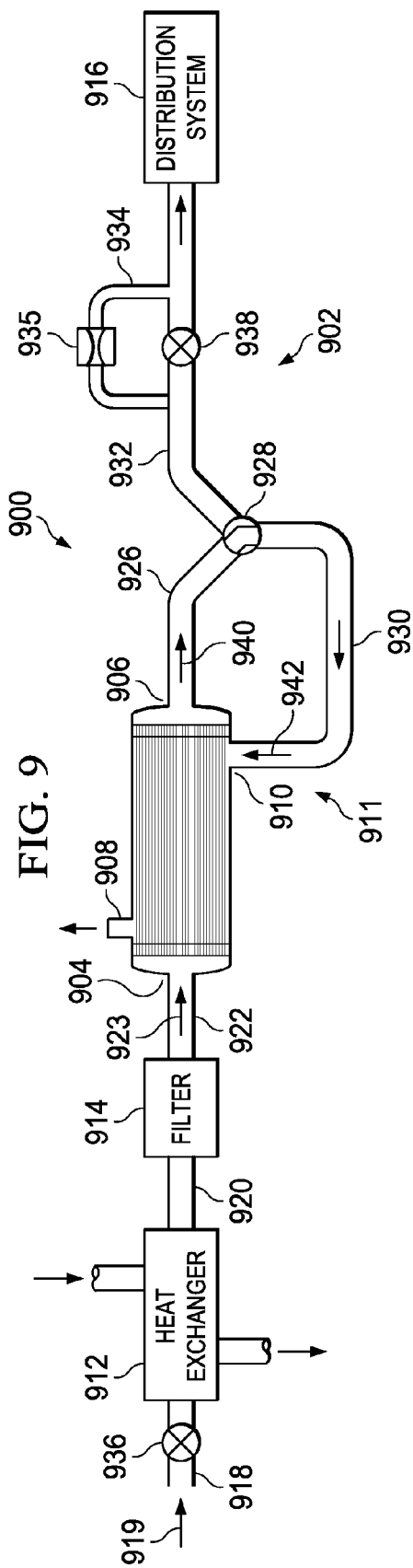
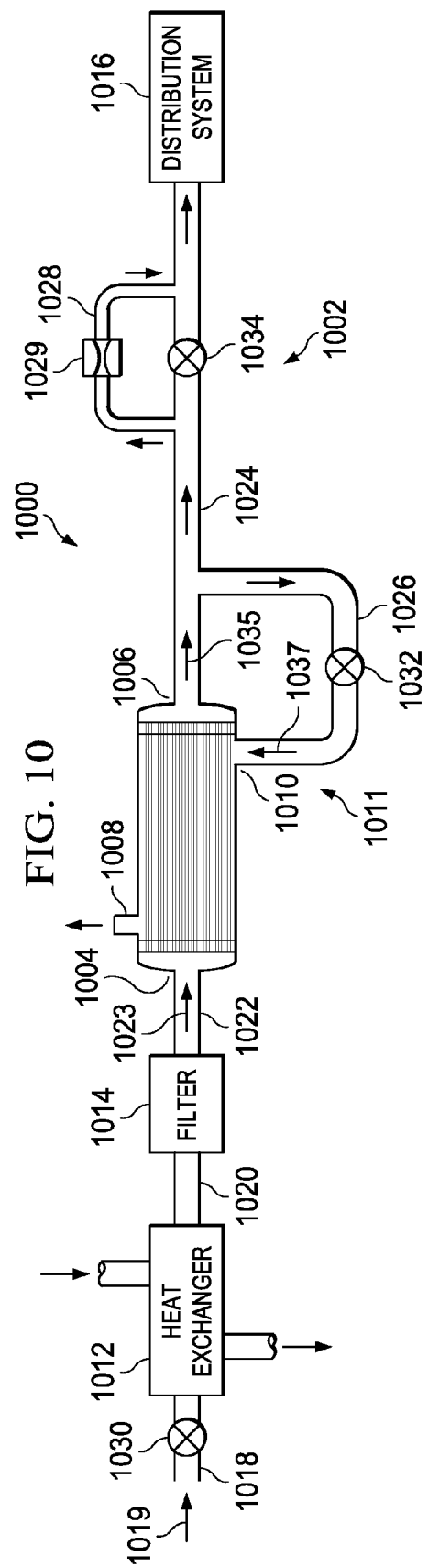
FIG. 9
FIG. 10

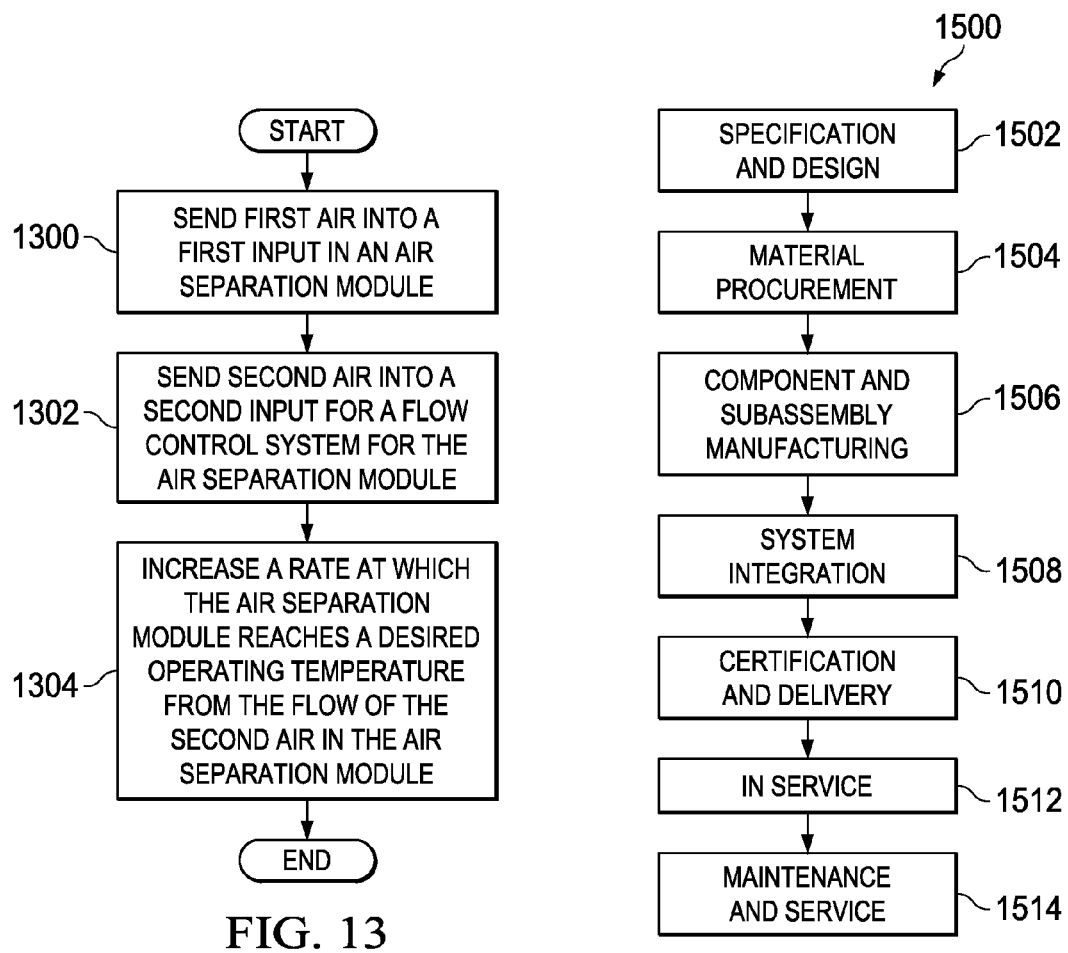
FIG. 13
FIG. 15
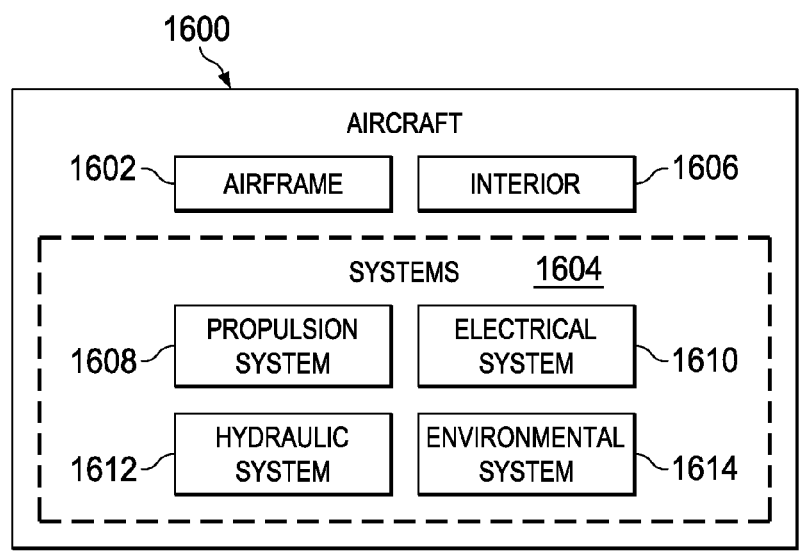
FIG. 16

WARMING SYSTEM FOR AIR SEPARATION MODULES

BACKGROUND INFORMATION

1. Field

The present disclosure relates generally to aircraft and, in particular, to inert gas generation systems for aircraft. Still more particularly, the present disclosure relates to a method and apparatus for warming an air separation module in an inert gas generation system for an aircraft.

2. Background

Many aircraft have inert gas generation systems. An inert gas generation system is used to render a fuel tank in an aircraft substantially inert. In these illustrative examples, fuel tanks may have a space above the fuel in which fuel vapors may be present. This space in the fuel tank is referred to as an ullage.

Inert gas generation systems are employed to reduce a possibility of combustion within the ullage in a fuel tank. Inert gas generation systems may be used to reduce the oxygen content in these spaces below a threshold needed for combustion. Without sufficient oxygen, fuel vapors in these locations are unable to ignite.

Inert gas generation systems may introduce an inert gas into these locations. This inert gas may be a gas, such as nitrogen, nitrogen enriched air, carbon dioxide, and other types of inert gases. With the use of an inert gas, the oxygen content may be reduced below a threshold for combustion.

Inert gas generation systems may employ air separation modules to generate inert gas. For example, an air separation module may be configured to generate an inert gas in the form of nitrogen enriched air from the air that is sent into the air separation module. The nitrogen enriched air is air that has higher nitrogen and lower oxygen content than the air that is sent into the air separation module.

Some currently available air separation modules include permeable membranes that separate the oxygen and nitrogen. These permeable membranes produce inert gas more efficiently above a selected temperature or within a selected temperature range. These temperatures are typically elevated temperatures as compared to the temperature when the aircraft is not in use. Material limitations are also present that preclude long-term operation above a certain temperature.

Aircraft inert gas generation systems are typically designed to operate near this temperature limit to reduce the size of the air separation module. For example, a permeable membrane in an air separation module may have a desired operating temperature of about 170 degrees Fahrenheit and a long-term temperature limit of about 190 degrees Fahrenheit. The air input into an air separation module may have these temperatures or even slightly higher temperatures. When an air separation module has not been used for some period of time, the temperature within the air separation module may be lower than the desired temperature.

As a result, a desired temperature for generating nitrogen enriched air at a desired level may not occur until the temperature of the air separation module reaches a desired temperature for providing a desired level of nitrogen in nitrogen enriched air. This warm-up time may take more than about 15 minutes before the air separation module is ready to operate to generate nitrogen enriched air with a desired oxygen level.

This warm-up time may increase the time needed to prepare an aircraft for operation. As a result, the time needed to prepare an aircraft for a flight may be longer than desired with these warm-up times.

Inert gas generation systems may reduce the warm-up time by using a high flow mode. In a high flow mode, the restriction downstream of the air separation module is reduced so that the flow rate of nitrogen enriched air increases. Additionally, the temperature in the air sent into the air separation module also may be increased to reduce the warm-up time. Even with these procedures, the time needed to warm up an air separation module may still be longer than desired.

Therefore, it would be desirable to have a method and apparatus that takes into account at least some of the issues discussed above as well as possibly other issues.

SUMMARY

In one illustrative embodiment, an apparatus comprises an air separation module, a first input, a first output, a second output, a flow control system. The air separation module is configured to generate an inert gas. The first input for the air separation module is configured to receive first air. The first output for the air separation module is configured to output the inert gas from the air separation module. The second output for the air separation module is configured to output separated air from the air separation module. The flow control system is configured to control a flow of air in the air separation module that increases a rate at which the air separation module reaches a desired operating temperature for generating the inert gas using a number of ports in the air separation module.

In another illustrative embodiment, an apparatus comprises a fluid separation module, a first input, an output, and a flow control system. The fluid separation module is configured to generate a desired fluid from a first fluid. The first input for the fluid separation module is configured to receive the first fluid. The output for the fluid separation module is configured to output the desired fluid. The flow control system is configured to control a flow of fluids in the fluid separation module that increases a rate at which the fluid separation module reaches a desired temperature for generating the desired fluid using a number of ports in the fluid separation module.

In yet another illustrative embodiment, a method for processing air is present. First air is sent into a first input in an air separation module. The air separation module is configured to generate nitrogen enriched air from the first air. Second air is sent into a second input for the air separation module. A rate at which the air separation module reaches a desired operating temperature is increased from a flow of the second air in the air separation module.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 7 is an illustration of an air separation module in an inert gas generation system in accordance with an illustrative embodiment;

FIG. 8 is an illustration of an air separation module in an inert gas generation system in accordance with an illustrative embodiment;

FIG. 9 is an illustration of an air separation module in an inert gas generation system in accordance with an illustrative embodiment;

FIG. 10 is an illustration of an air separation module in an inert gas generation system in accordance with an illustrative embodiment;

FIG. 13 is an illustration of a flowchart of a process for processing air in an inert gas generation system in accordance with an illustrative embodiment;

FIG. 15 is an illustration of an aircraft manufacturing and service method in accordance with an illustrative embodiment; and FIG. 16 is an illustration of an aircraft in which an illustrative embodiment may be implemented.

DETAILED DESCRIPTION

The different illustrative embodiments recognize and take into account a number of different considerations. The different illustrative embodiments recognize and take into account that reducing the warm-up time for an air separation module may reduce the time needed to send inert gas into a fuel tank to provide an inert condition for the fuel tanks. In this manner, an availability of an aircraft may be made more quickly by reducing the warm-up time for air separation modules.

The different illustrative embodiments recognize and take into account that with the current design for an air separation module, an outlet for oxygen enriched air is located closer to the end where the input is for the air than the end for the output of the nitrogen enriched air. The different illustrative embodiments recognize and take into account that this location of the outlet for the oxygen enriched air may result in less thermal energy available because warm oxygen enriched air exits through this outlet rather than traveling through more areas within the air separation module. The different illustrative embodiments recognize and take into account that this configuration of inputs and outputs may result in more time being needed for warming up the air separation module than desired.

Thus, the different illustrative embodiments provide a method and apparatus for warming up an air separation module. In one illustrative embodiment, an apparatus comprises an air separation module, a first input, a first output, a second output, and a second input. The air separation module is configured to generate an inert gas, such as nitrogen enriched air.

The first input for the air separation module is configured to receive first air. The first output for the air separation module is configured to output the nitrogen enriched air from the air separation module. The second output for the air separation module is configured to output separated air, such as oxygen enriched air, from the air separation module. The second input for the air separation module is configured to receive second air, wherein the second input for the air separation module is configured to increase a rate at which the air separation module reaches a desired operating temperature.

Figure 1:
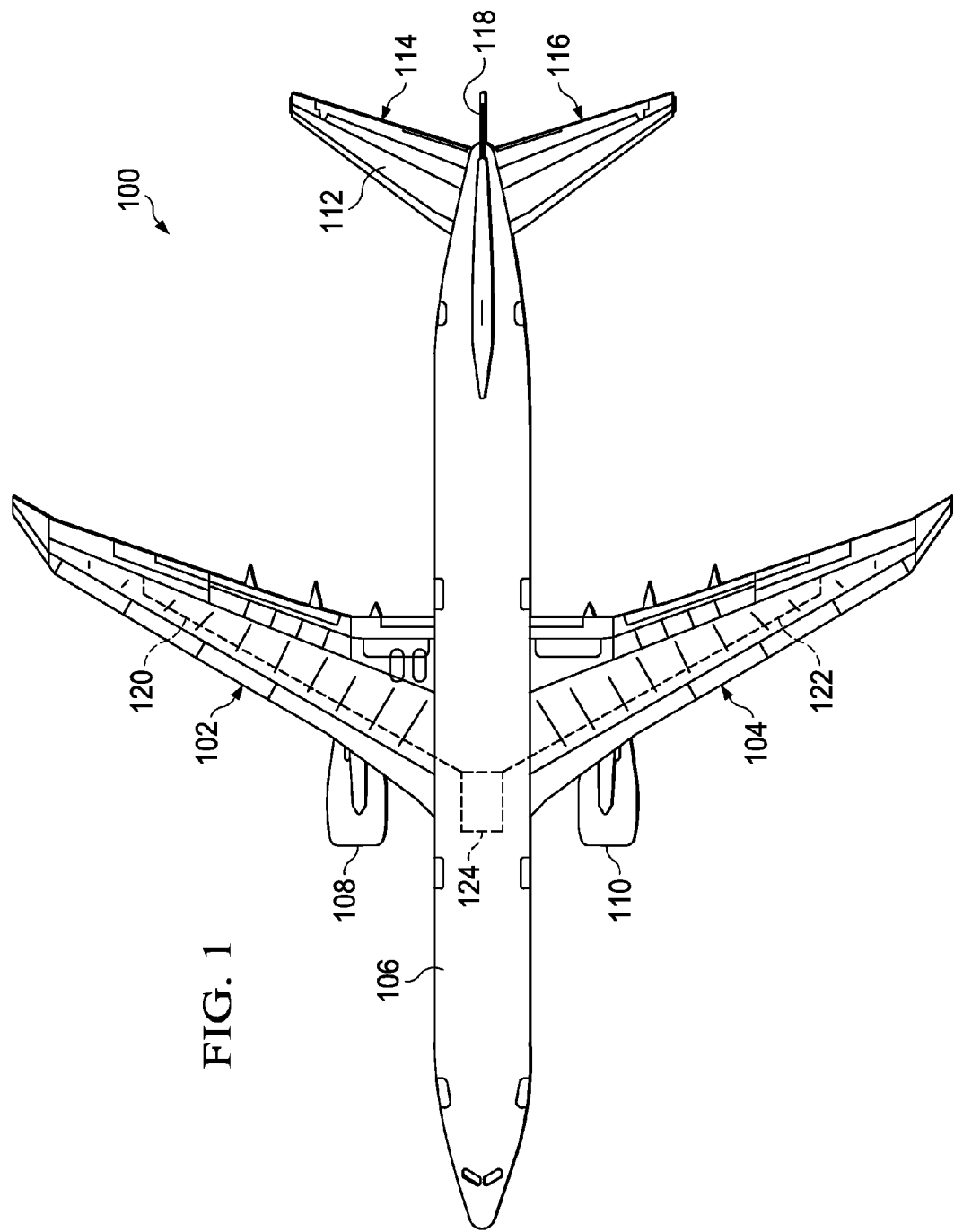
FIG. 1 is an illustration of an aircraft in accordance with an illustrative embodiment.

With reference now to the figures and, in particular, with reference to FIG. 1, an illustration of an aircraft is depicted in accordance with an illustrative embodiment. Aircraft 100 is an example of a platform in which an illustrative embodiment may be implemented.

In this illustrative example, aircraft 100 has wing 102 and wing 104 attached to body 106. Additionally, aircraft 100 also has engine 108 attached to wing 102 and engine 110 attached to wing 104. Tail 112 of aircraft 100 has horizontal stabilizer 114, horizontal stabilizer 116, and vertical stabilizer 118. In this illustrative example, wing 102 may have fuel tank 120, and wing 104 may have fuel tank 122.

As depicted in these illustrative examples, inert gas generation system 124 may be used to send inert gas into fuel tank 120 and fuel tank 122 to reduce combustibility in the ullages that may be present within fuel tank 120 and fuel tank 122. In particular, an illustrative embodiment may be implemented in inert gas generation system 124 to reduce an amount of time needed to warm up air separation modules within inert gas generation system 124.

Figure 2:
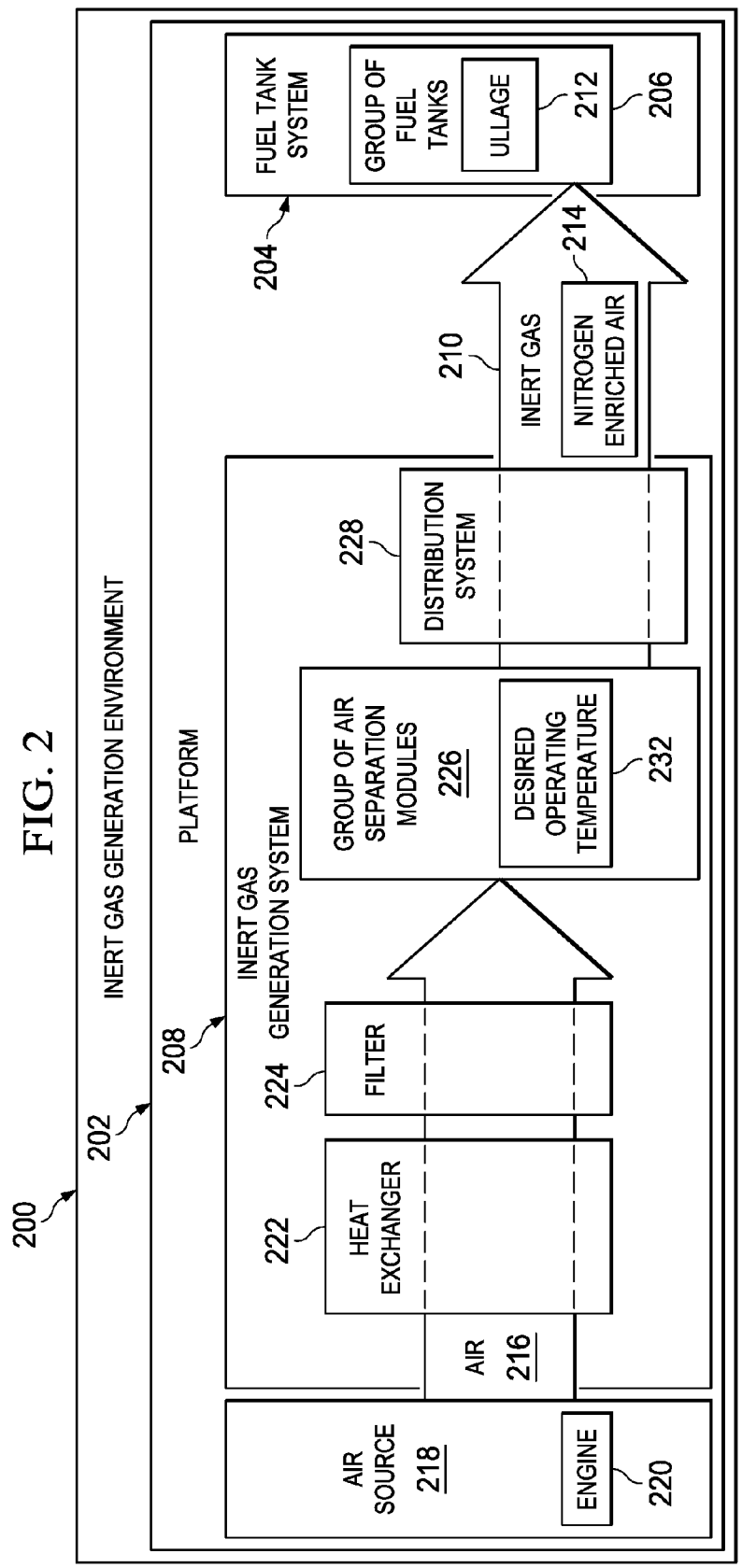
FIG. 2 is an illustration of a block diagram of an inert gas generation environment in accordance with an illustrative embodiment.

With reference now to FIG. 2, an illustration of a block diagram of an inert gas generation environment is depicted in accordance with an illustrative embodiment. In this illustrative example, inert gas generation environment 200 comprises platform 202 with fuel tank system 204. Aircraft 100 in FIG. 1 is an example of one implementation for platform 202 in FIG. 2.

In this illustrative example, fuel tank system 204 comprises group of fuel tanks 206. A "group", as used herein, with reference to items, means one or more items. For example, "group of fuel tanks 206" is one or more fuel tanks.

In this illustrative example, inert gas generation system 208 sends inert gas 210 into fuel tank system 204. Inert gas 210 reduces combustibility in ullage 212 in fuel tank system 204. Ullage 212 may be located in group of fuel tanks 206.

Inert gas 210 may be any gas that reduces combustibility of any fuel vapors within group of fuel tanks 206. In this particular illustrative example, inert gas 210 takes the form of nitrogen enriched air 214. In other examples, inert gas 210 may be nitrogen, nitrogen enriched air, carbon dioxide, and other types of inert gases.

In these illustrative examples, inert gas generation system 208 generates nitrogen enriched air 214 using air 216 from air source 218. As depicted, air source 218 takes the form of engine 220.

As depicted, inert gas generation system 208 includes heat exchanger 222, filter 224, group of air separation modules 226, and distribution system 228. In these illustrative examples, air 216 from engine 220 is sent to heat exchanger 222. Air 216 may be heated air under pressure. As depicted, heat exchanger 222 may reduce a temperature of air 216 to a desirable temperature for use in generating inert gas 210. Air 216 then passes through filter 224. Filter 224 is configured to remove undesired contaminants within air 216.

Thereafter, air 216 passes through group of air separation modules 226 to generate inert gas 210 in the form of nitrogen enriched air 214. When passing through group of air separation modules 226, air 216 may still be heated. Air 216 may cause group of air separation modules 226 to reach a desired temperature of operation of group of air separation modules 226.

Distribution system 228 may be a network of pipes without outlets that extends through fuel tank system 204. Distribution system 228 is configured to send nitrogen enriched air 214 generated by group of air separation modules 226 into ullage 212 within fuel tank system 204. In these illustrative examples, nitrogen enriched air 214 reduces the oxygen in ullage 212 in a manner that reduces combustibility of any fuel vapors within ullage 212.

In these illustrative examples, an illustrative embodiment may be implemented in one or more of group of air separation modules 226. In particular, the flow of air 216 through group of air separation modules 226 may be controlled in a manner that reduces time needed to warm up group of air separation modules 226. In other words, a rate at which group of air separation modules 226 reaches desired operating temperature 232 may be increased in an illustrative embodiment.

Figure 3:
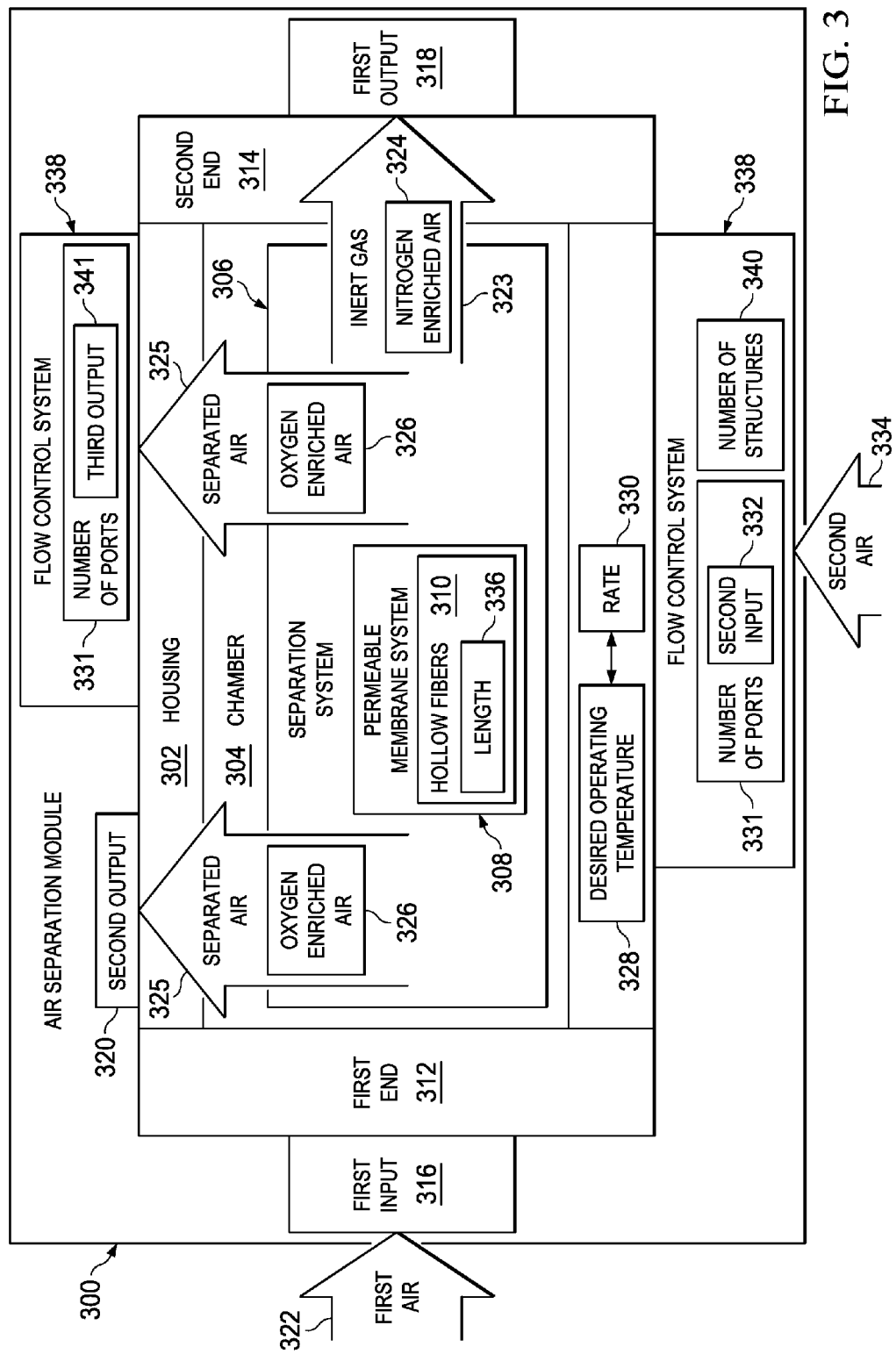
FIG. 3 is an illustration of a block diagram of an air separation module in accordance with an illustrative embodiment.

With reference now to FIG. 3, an illustration of a block diagram of an air separation module is depicted in accordance with an illustrative embodiment. As depicted, air separation module 300 is an example of an air separation module within group of air separation modules 226 in FIG. 2.

As depicted, air separation module 300 comprises housing 302 with chamber 304. Separation system 306 is located within chamber 304. In these illustrative examples, separation system 306 may comprise permeable membrane system 308. Permeable membrane system 308 may be in the form of hollow fibers 310. These hollow fibers may be arranged to extend from first end 312 of housing 302 to second end 314 of housing 302.

In these illustrative examples, first input 316 is located at first end 312. First output 318 is located at second end 314. Second output 320 for air separation module 300 is located closer to first input 316 at first end 312 than first output 318 at second end 314. Typically, second output 320 is located closer to first input 316 to establish counter-flow of oxygen enriched air 326, which maximizes the partial pressure difference that drives oxygen permeation along the length of hollow fibers 310.

In these illustrative examples, first air 322 is input into first input 316. First air 322 may be at least a portion of air 216 from engine 220 in FIG. 2. In these illustrative examples, first air 322 is heated and also may be under pressure. First air 322 has a temperature that may be at least desired operating temperature 328 for air separation module 300.

In these illustrative examples, first air 322 results in the generation of inert gas 323 and separated air 325. In this particular example, inert gas 323 takes the form of nitrogen enriched air 324, and separated air 325 takes the form of oxygen enriched air 326.

More specifically, separation system 306 separates first air 322 into nitrogen enriched air 324 and oxygen enriched air 326. Nitrogen enriched air 324 is air having a higher nitrogen content than first air 322. Oxygen enriched air 326 is air that has a higher oxygen content than first air 322. In these illustrative examples, nitrogen enriched air 324 from air separation module 300 is a portion of nitrogen enriched air 214 generated by group of air separation modules 226 in FIG. 2.

As depicted, a desired level of nitrogen in nitrogen enriched air 324 may be generated by separation system 306 when air separation module 300 operates at desired operating temperature 328 for air separation module 300. In these illustrative examples, the time needed to reach desired operating temperature 328 may take longer than desired, as discussed above.

The different illustrative embodiments recognize and take into account that the flow of first air 322 through first input 316 into hollow fibers 310 may flow in a manner such that the amount of first air 322 is separated into oxygen enriched air 326 and nitrogen enriched air 324. The flow is such that oxygen enriched air 326 flowing out of hollow fibers 310 and out of second output 320 may be greater than nitrogen enriched air 324 that flows inside hollow fibers 310 along length 336 of hollow fibers 310 to be output through first output 318.

This reduced amount of nitrogen enriched air 324 flowing through length 336 of hollow fibers 310 may result in a longer than desired time to reach desired operating temperature 328. In other words, oxygen enriched air 326 may not flow along all of length 336 of hollow fibers 310. As a result, hollow fibers 310 may heat up more slowly with less exposure to oxygen enriched air 326 along length 336 of hollow fibers 310. More specifically, portions of hollow fibers 310 closer to second output 320 near first end 312 reach desired operating temperature 328, more quickly than portions closer to first output 318 at second end 314. As a result, hollow fibers 310, as a whole, do not reach desired operating temperature 328 as quickly as desired.

Rate 330, at which air separation module 300 reaches desired operating temperature 328, may be increased through the use of flow control system 338 for air separation module 300. In these illustrative examples, flow control system 338 is configured to receive second air 334 and use second air 334 to cause a flow of second air 334 within air separation module 300 that increases rate 330 at which air separation module 300 reaches desired operating temperature 328. In these illustrative examples, second air 334 also is heated and may be under pressure. The temperature of second air 334 may be at least desired operating temperature 328 in these illustrative examples.

In these illustrative examples, second air 334 flows outside of hollow fibers 310. Further, second air 334 may flow toward second output 320 in a manner that results in greater portions of hollow fibers 310 being exposed to the heat from second air 334. Second air 334 flows out of second output 320 along with oxygen enriched air 326 generated by first air 322 in these illustrative examples.

In these illustrative examples, flow control system 338 includes number of ports 331. Number of ports 331 are associated with air separation module 300. In particular, number of ports 331 are in housing 302 in air separation module 300. In these illustrative examples, number of ports 331 may include at least one of second input 332 and third output 341. Additionally, flow control system 338 also may include number of structures 340. As depicted, number of structures 340 is associated with second input 332.

When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In some cases, number of structures 340 may not be associated with second input 332. Instead, these structures may be placed at locations within chamber 304.

Second input 332 in flow control system 338 is configured to cause a flow of second air 334 through air separation module 300 that increases rate 330 at which hollow fibers 310 in permeable membrane system 308 in air separation module 300 reach desired operating temperature 328. The flow of second air 334 also may affect the flow of first air 322 within chamber 304.

In these illustrative examples, second air 334 flowing through second input 332 into air separation module 300 may cause more of first air 322, second air 334, or a combination of the two to flow through length 336 of hollow fibers 310.

Thus, with the use of flow control system 338, at least one of second input 332 and number of structures 340 may cause second air 334 to flow within chamber 304 in a manner that increases rate 330 at which air separation module 300 reaches desired operating temperature 328. In these illustrative examples, the flow of second air 334 also may change the flow of first air 322 in a manner that increases rate 330 in which air separation module 300 reaches desired operating temperature 328.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In another illustrative example, flow control system 338 may include third output 341 instead of second input 332. In these illustrative examples, third output 341 is located closer to second end 314 than second output 320.

As depicted, third output 341 in flow control system 338 is configured to cause a flow of oxygen enriched air 326 through air separation module 300 and out through third output 341 in a manner that increases rate 330 at which hollow fibers 310 in permeable membrane system 308 in air separation module 300 reach desired operating temperature 328. In particular, oxygen enriched air 326 may flow outside of hollow fibers 310 and along length 336 of hollow fibers 310 in chamber 304 in a direction to third output 341 in these illustrative examples, rather than only to second output 320. In other words, the use of third output 341 may change the flow of oxygen enriched air 326 within chamber 304 in a manner that increases a rate at which hollow fibers 310 reaches desired operating temperature 328.

Further, if second input 332 is also present in addition to third output 341, second air 334 also may flow through at least one of second output 320 and third output 341. With this example, second input 332 may be located closer to first end 312 than second end 314. The location is selected to reduce the flow of second air 334 that flows directly to third output 341. In other illustrative examples, third output 341 and second input 332 may be placed such that they are farther apart from each other and not opposite to each other.

In these illustrative examples, at least one of second input 332 and third output 341 in flow control system 338 may cause a flow of air within separation system 306 in chamber 304 over a greater surface area of permeable membrane system 308 within chamber 304 in which the air flows. The flow of air may be oxygen enriched air 326, second air 334, or both.

In particular, the flow of air is over a greater surface area on the exterior of hollow fibers 310. This increased flow of oxygen enriched air 326, second air 334, or both over the surface area of hollow fibers 310 within separation system 306 increases a rate at which hollow fibers 310 may reach desired operating temperature 328 from exposure to heat in first air 322 input into first input 316 and second air 334 input into second input 332.

Thus, flow control system 338 is configured to control a flow of air in air separation module 300 that increases rate 330 at which air separation module 300 reaches desired operating temperature 328 for generating inert gas 323. In these illustrative examples, the air may be at least one of oxygen enriched air 326, nitrogen enriched air 324, and second air 334.

The illustration of inert gas generation environment 200 shown in block form in FIG. 2 and air separation module 300 shown in block form in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although an illustrative embodiment has been described with respect to aircraft, the illustrative embodiment may be applied to other types of platforms. For example, without limitation, other illustrative embodiments may be applied to a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a manufacturing facility, a building, and/or some other suitable platform in which permeable membranes are used to separate gases.

In still other illustrative examples, other inputs, outputs, or structures may be included in flow control system 338 in addition to and/or in place of the ones illustrated in these examples. These additional components may be selected to control the flow of heated air within air separation module 300 in a manner that increases a rate at which air separation module 300 reaches desired operating temperature 328. In particular, these components may be selected to provide a flow of heated air within air separation module 300 that exposes greater portions of hollow fibers 310 to the heated air.

As another illustrative example, other illustrative embodiments may be applied to other types of inert gas 210 other than nitrogen enriched air 214. For example, other gases or fluids may be input into group of air separation modules 226 to obtain inert gas 210 in other forms. For example, the other types of inert gas may be nitrogen, carbon dioxide, and other types of gas that may reduce combustibility of fuel vapors or other vapors in an ullage within fuel tank system 204.

The embodiments illustrated herein depict the bore-side feed hollow fiber permeable membrane air separation modules with the hollow fibers oriented along the axis of the air separation module. These figures are typical of air separation modules used in aircraft inert gas generation systems. Other embodiments may use air separation modules that employ hollow fibers that are helically wound such that the fibers are oriented at an angle to the axis of the air separation module. Yet other embodiments may use air separation modules that employ other hollow fiber orientations. Still other embodiments may use shell-side feed hollow fiber permeable membrane air separation modules, air separation devices that configure the permeable membrane in flat sheets, and other packaging methods.

Figure 4:
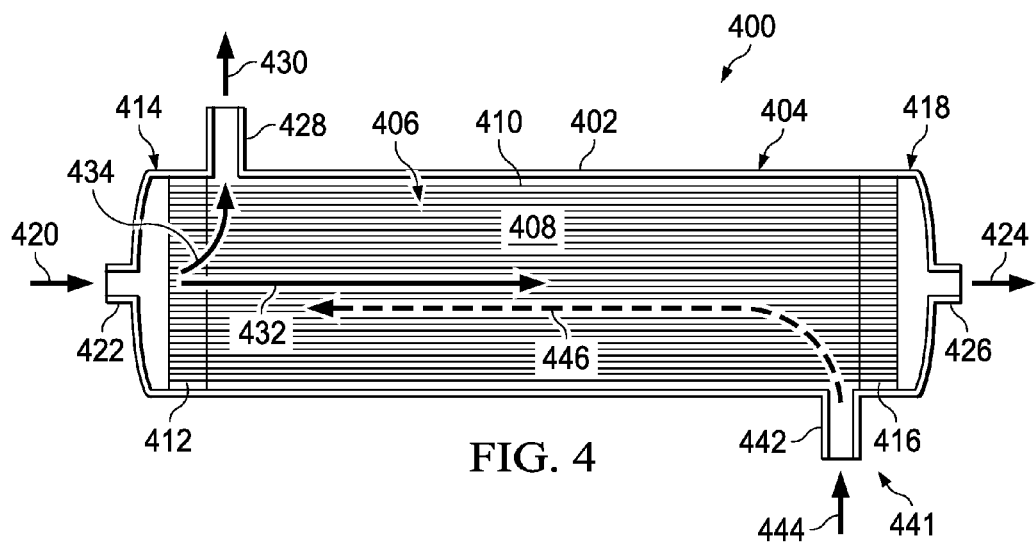
FIG. 4 is an illustration of an air separation module in accordance with an illustrative embodiment.

With reference now to FIG. 4, an illustration of an air separation module is depicted in accordance with an illustrative embodiment. In this illustrative example, air separation module 400 is an example of one implementation for air separation module 300 in FIG. 3.

As depicted, air separation module 400 comprises housing 402 with chamber 404 inside of housing 402. Separation system 406 is located within chamber 404 inside of housing 402. In this illustrative example, separation system 406 comprises permeable membrane system 408 in the form of hollow fibers 410.

In this illustrative example, hollow fibers 410 are connected to first tubesheet 412 at first end 414 of housing 402. Additionally, hollow fibers 410 also are connected to second tubesheet 416 at second end 418 of housing 402. These tubesheets may be comprised of epoxy, adhesive, or some other suitable material. In other illustrative examples, the tubesheets may be structures to which hollow fibers 410 are connected.

The tubesheet is configured such that first air 420 sent into first input 422 enters hollow fibers 410 and reduces and/or eliminates flow of first air 420 between hollow fibers 410 through first tubesheet 412 as first air 420 flows through first input 422 into chamber 404. In a similar fashion, second tubesheet 416 is configured to direct nitrogen enriched air 424 through hollow fibers 410 at second tubesheet 416 rather than between hollow fibers 410 when being output through first output 426. However, once first air 420 passes through first tubesheet 412, first air 420 may flow through and/or out of hollow fibers 410 within chamber 404. In these illustrative examples, second output 428 is configured to output oxygen enriched air 430 from air separation module 400.

As depicted, hollow fibers 410 are configured to allow first air 420 to flow in the direction of path 432 along the length of hollow fibers 410. The flow of first air 420 in the direction of path 432 means that first air 420 flows in the direction of path 432 but may not be always on path 432. Paths, as depicted in the different illustrative examples, are intended to show general directions of fluid or airflow and not exact paths that are followed by the fluid or airflow.

As first air 420 flows through hollow fibers 410 past first tubesheet 412, hollow fibers 410 are configured to separate first air 420 into nitrogen enriched air 424 and oxygen enriched air 430. The separation of first air 420 into nitrogen enriched air 424 and oxygen enriched air 430 results in oxygen enriched air 430 flowing in a direction of path 434.

For example, hollow fibers 410 are comprised of a membrane configured to allow oxygen molecules to pass through the membrane more readily than nitrogen molecules. Hollow fibers 410 are configured such that less nitrogen than oxygen passes through the membrane in hollow fibers 410.

As a result, as first air 420 travels in the direction of path 432, first air 420 within hollow fibers 410 has more nitrogen than first air 420 sent through first input 422. Additionally, first air 420 traveling through the membranes in hollow fibers 410 in a direction of path 434 has increased oxygen content as compared to first air 420 entering first input 422. Thus, oxygen enriched air 430 is air that has more oxygen than first air 420. Nitrogen enriched air 424 is air that has more nitrogen than first air 420.

In these illustrative examples, first air 420 is pressurized and heated. First air 420 is considered to be heated when first air 420 has a temperature that is greater than the temperature around air separation module 400.

In these illustrative examples, hollow fibers 410 have a desired operating temperature at which hollow fibers 410 generate a desired level of nitrogen in nitrogen enriched air 424. When air separation module 400 has not been used for some period of time, the temperature of air separation module 400 may not be at the desired operating temperature. In other words, hollow fibers 410 may not be at the desired operating temperature for producing nitrogen enriched air 424 at a desired level.

In these illustrative examples, hollow fibers 410 in air separation module 400 may be warmed up by sending first air 420 through air separation module 400. As first air 420 flows through air separation module 400, hollow fibers 410 are heated to reach the desired operating temperature.

As depicted, the flow of first air 420 through hollow fibers 410 may result in the initial warming of the first few inches of hollow fibers 410. This situation causes permeation through that small section and may result in a significant amount of oxygen enriched air 430 flowing in the direction of path 434. As a result, the temperature of oxygen enriched air 430 that exits through second output 428 is not available to warm the remaining length of hollow fibers 410. As a result, the portion of hollow fibers 410 closer to second end 418 does not heat up as fast as the portion of hollow fibers 410 closer to first end 414.

In these illustrative examples, the flow of air along path 432 is nitrogen enriched air 424 flowing inside of hollow fibers 410. The flow of air along path 434 and path 446 is oxygen enriched air 430 flowing outside of hollow fibers 410. As a result, first air 420 causes more heating from inside of hollow fibers 410 than outside of hollow fibers 410.

In the different illustrative examples, air separation module 400 includes flow control system 441. As depicted, flow control system 441 comprises second input 442. Second input 442 is configured to receive second air 444. Second input 442 is positioned on air separation module 400 such that second air 444 changes the flow within air separation module 400 in a manner that increases the rate at which air separation module 400 reaches a desired operating temperature.

Second air 444 may be from the same source as first air 420 or may be connected to first output 426. Second air 444 also may be heated and may be under pressure. Second air 444 sent through second input 442 is configured to increase a rate at which air separation module 400 reaches the desired operating temperature. In particular, the desired operating temperature is a desired operating temperature for hollow fibers 410 within air separation module 400.

In these illustrative examples, second air 444 flowing through second input 442 causes a flow of second air 444 in the direction of path 446. As depicted, second air 444 flows outside hollow fibers 410, while first air 420 flows inside hollow fibers 410. Second air 444 causes heating of hollow fibers 410 from the exterior of hollow fibers 410.

As can be seen, path 446 is in a direction upstream towards first end 414 of housing 402 and flows through second output 428. As a result, air flow through hollow fibers 410 in a direction of path 446 increases the exposure of hollow fibers 410 to at least one of first air 420 and second air 444 through more of the length of hollow fibers 410 than without using second air 444.

In this manner, the temperature of air separation module 400 may increase at a greater rate to reach the desired operating temperature than without second air 444 flowing through second input 442 in flow control system 441. As a result, the heating of hollow fibers 410 from the inside by nitrogen enriched air 424 and from the exterior of oxygen enriched air 430 and second air 444 along paths 432, 434, and 436 increases a rate at which air separation module 400 reaches a desired operating temperature.

Figure 5:
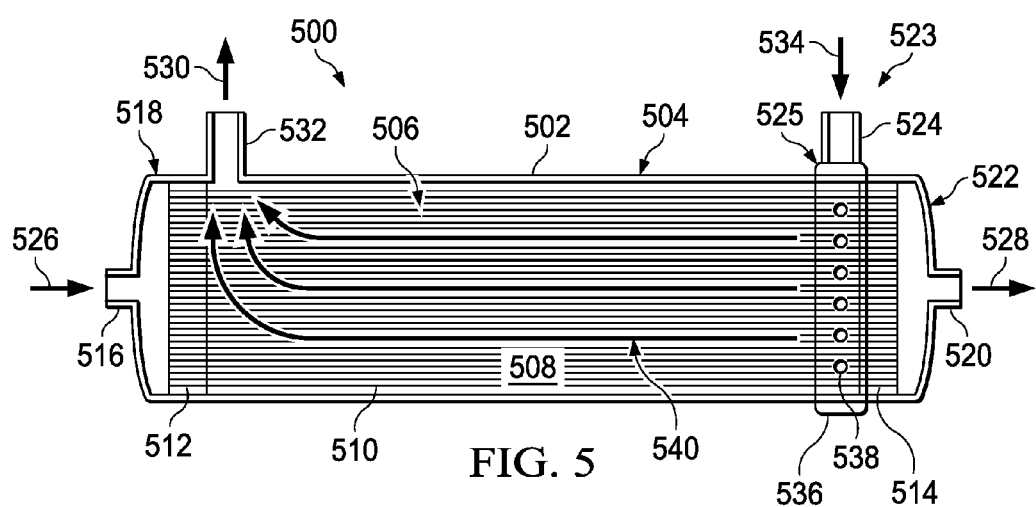
FIG. 5 is an illustration of an air separation module in accordance with an illustrative embodiment.

With reference now to FIG. 5, an illustration of an air separation module is depicted in accordance with an illustrative embodiment. Air separation module 500 is an example of another implementation for air separation module 300 in FIG. 3.

In this illustrative example, air separation module 500 comprises housing 502 with chamber 504. Separation system 506 is located within chamber 504. In this illustrative example, separation system 506 comprises permeable membrane system 508 in the form of hollow fibers 510. Hollow fibers 510 are connected to first tubesheet 512 and second tubesheet 514.

Further, first input 516 is located at first end 518 of air separation module 500. First output 520 is located at second end 522 of air separation module 500. Air separation module 500 also has second output 532 and flow control system 523. As depicted, flow control system 523 comprises second input 524 and structure 525.

In these illustrative examples, first air 526 flows through first input 516 into air separation module 500. As first air 526 flows in air separation module 500, first air 526 may be separated into nitrogen enriched air 528, which flows out of first output 520, and oxygen enriched air 530, which flows out of second output 532.

In these illustrative examples, second air 534 may also be sent through second input 524 to warm up air separation module 500. In this illustrative example, structure 525 comprises hollow ring 536 with holes 538 leading into chamber 504. Second input 524 is connected to hollow ring 536. As a result, second air 534 flows through second input 524 into hollow ring 536 and into chamber 504 through holes 538. This configuration of second input 524 and structure 525 generates air flow of second air 534 in directions shown by paths 540 in an upstream direction from around second end 522 in an upstream direction toward first end 518 and through second output 532. As a result, second air 534 also flows out of second output 532 along with oxygen enriched air 530. Second air 534 flows outside hollow fibers 510, while first air 526 flows inside hollow fibers 510.

Figure 6:
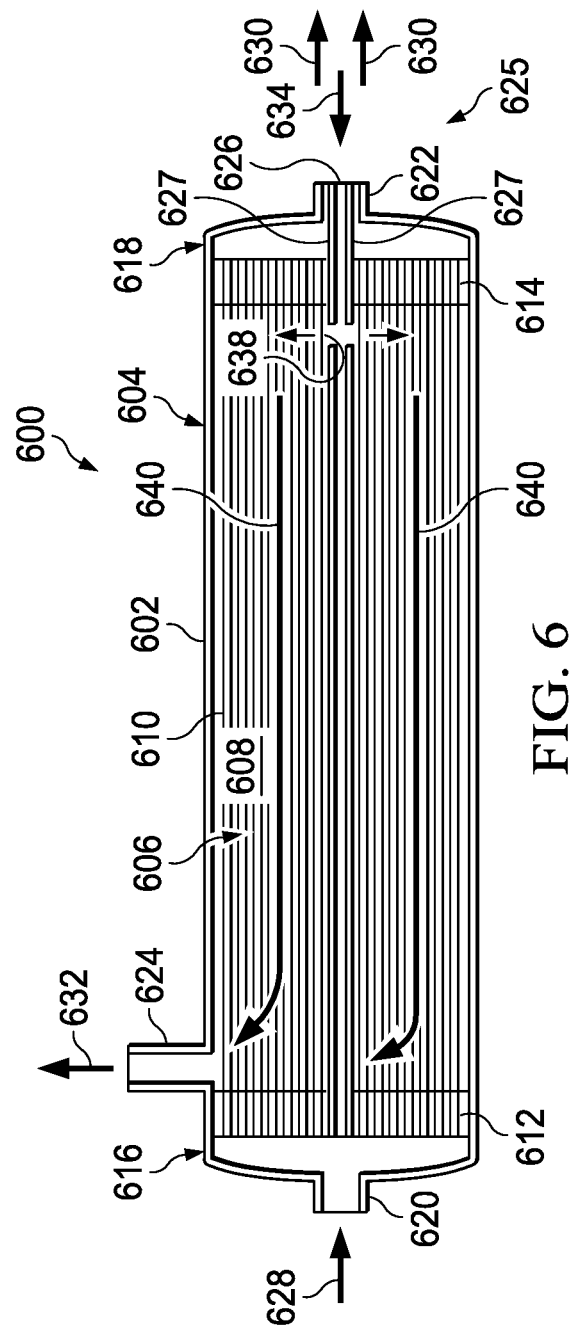
FIG. 6 is another illustration of an air separation module in accordance with an illustrative embodiment.

Turning now to FIG. 6, another illustration of an air separation module is depicted in accordance with an illustrative embodiment. Air separation module 600 is another example of an implementation for air separation module 300 in FIG. 3.

In this illustrative example, air separation module 600 comprises housing 602 with chamber 604. Separation system 606 is located within chamber 604. Separation system 606 comprises permeable membrane system 608 in the form of hollow fibers 610. Hollow fibers 610 are connected at first tubesheet 612 and second tubesheet 614. First tubesheet 612 is located at first end 616 of air separation module 600, while second tubesheet 614 is located at second end 618 of air separation module 600.

As illustrated, first input 620 is located at first end 616 of air separation module 600. First output 622 is located at second end 618 of air separation module 600. Second output 624 is located closer to first end 616 than second end 618 of air separation module 600.

As depicted, air separation module 600 also includes flow control system 625. Flow control system 625 comprises second input 626 and tube 627. As illustrated, second input 626 is located at second end 618 of air separation module 600.

In this illustrative example, second input 626 is located concentrically within first output 622. Tube 627 is associated with second input 626. Tube 627 is located centrally within chamber 604. Tube 627 extends from second input 626 into first tubesheet 612 at first end 616.

In this illustrative example, first air 628 is sent through first input 620. Nitrogen enriched air 630 is output through first output 622. Oxygen enriched air 632 is output through second output 624.

Second air 634 is sent through second input 626 into tube 627. Tube 627 has holes 638 located within chamber 604 after second tubesheet 614. Holes 638 allow for second air 634 to flow in the direction of paths 640. Second air 634 flows in the direction of paths 640 to exit through second output 624 in these illustrative examples. Second air 634 flows outside hollow fibers 610, while first air 628 flows inside hollow fibers 610. As a result, second air 634 is also output through second output 624 along with oxygen enriched air 632.

This flow of second air 634 in an upstream direction provides increased exposure to longer lengths of hollow fibers 610 to first air 628 and second air 634, as compared to when only first air 628 is sent into first input 620. In this manner, a rate at which air separation module 600 reaches a desired operating temperature may be increased as compared to only using first air 628 sent through first input 620.

With reference now to FIG. 7, an illustration of an air separation module in an inert gas generation system is depicted in accordance with an illustrative embodiment. In this illustrative example, air separation module 700 is located in inert gas generation system 702. Air separation module 700 may be implemented using air separation module 400 in FIG. 4 and may be an example of an implementation for air separation module 300 in FIG. 3.

In this illustrative example, air separation module 700 has first input 704, first output 706, second output 708, and second input 710 in flow control system 711. Inert gas generation system 702 includes heat exchanger 712, filter 714, and distribution system 716.

In this illustrative example, air 718 flows through pipe 720 into heat exchanger 712. Cooling air 722 may flow through heat exchanger 712 to cool air 718 to a desired temperature. Air 718 flows from heat exchanger 712 through pipe 724. Air 718 then flows into air separation module 700 through first input 704 via a connection from filter 714 to first input 704 by pipe 726.

As depicted, pipe 726 is connected to pipe 728. Pipe 728 also has a connection to second input 710. First output 706 of air separation module 700 is connected to pipe 730, which is also connected to pipe 732 before being connected to distribution system 716. Pipe 732 has low flow orifice 734, which is configured to reduce a flow of air through pipe 732.

In these illustrative examples, valve 740 is located in pipe 720. Valve 742 is located in pipe 728. Valve 744 is located in pipe 730. Valve 740 may be in an open position or a closed position to control the amount of air 718 that flows to air separation module 700. The portion of air 718 that flows through first input 704 is first air 746. The portion of air 718 that flows through pipe 728 is second air 748 in these illustrative examples.

Valve 742 can be in an open or closed position and may control the amount of second air 748 that flows into second input 710 in air separation module 700. Valve 744 controls the amount of nitrogen enriched air 750 that flows into distribution system 716.

During the warm up of air separation module 700, valve 740 is in an open position. In these illustrative examples, when a valve is in an open position, the valve may be partially open or fully open. When a valve is in a closed position, the valve is considered to be fully closed. Valve 742 also is in an open position.

In these illustrative examples, valve 744 may be in an open position or a closed position during the warm up of air separation module 700. Valve 744 may be in a closed position to reduce the flow of nitrogen enriched air 750 with an undesired quality produced before warm up through pipe 730 that enters the fuel tank system through distribution system 716. Valve 744 may be in an open position to increase the flow of warm first air 746 into nitrogen enriched air 750 through air separation module 700 to increase the warming rate.

In one illustrative embodiment, the closing or opening of valve 744 may depend on whether the fuel tanks are typically already inert on start-up. For example, if the fuel tank system is already inert, valve 744 may be closed to reduce the flow of nitrogen enriched air 750 with a poor quality from entering the fuel tank system.

Placing valve 744 in a closed position does not shut off the flow of nitrogen enriched air 750 from first output 706 but reduces the flow in this illustrative example. When valve 744 is in a closed position, nitrogen enriched air 750 output from first output 706 flows through pipe 732 at a reduced rate as compared to flowing through pipe 730. When air separation module 700 has reached a desired operating temperature, valve 742 is moved to a closed position.

Turning now to FIG. 8, an illustration of an air separation module in an inert gas generation system is depicted in accordance with an illustrative embodiment. In this illustrative example, air separation module 800 is located in inert gas generation system 802. Air separation module 800 may be implemented using air separation module 400 in FIG. 4.

As depicted, air separation module 800 has first input 804, first output 806, second output 808, and second input 810. Second input 810 is part of flow control system 811 in air separation module 800. Inert gas generation system 802 includes heat exchanger 812, filter 814, and distribution system 816.

Air 818 enters inert gas generation system 802 through pipe 820, which is connected to heat exchanger 812. Pipe 821 connects heat exchanger 812 to filter 814. Pipe 822 connects filter 814 to first input 804 of air separation module 800. Pipe 823 connects first output 806 of air separation module 800 to distribution system 816. Pipe 824 is connected to pipe 823 and to second input 810 of air separation module 800. Pipe 826 is connected to pipe 823.

In these illustrative examples, valve 830 is associated with pipe 820. Valve 832 is associated with pipe 824. Valve 834 and valve 836 are associated with pipe 823. Pipe 826 has low flow orifice 837.

When air separation module 800 is being warmed up, valve 832 is placed into an open position to allow a flow of second air 840 into air separation module 800. This flow of second air 840 is in addition to the flow of first air 842 into air separation module 800. In this illustrative example, second air 840 is a portion of nitrogen enriched air 843 output through first output 806. In this example, second air 840 is from a downstream source as opposed to the example illustrated in FIG. 7 in which second air 748 was from an upstream source.

In these illustrative examples, when valve 832 is in an open position, valve 834 and valve 836 may both also be in an open position. Further, one or more of these valves may be in a partially closed or completely closed position during the warm up of air separation module 800. When air separation module 800 has completed warming up, valve 832 may be moved to a closed position. Thereafter, valve 834 and valve 836 may be selectively moved to an open position to provide a desired amount of nitrogen enriched air 843 to distribution system 816. When valve 832 is open, an additional flow area is opened up so that the flow rates of first air 842 and nitrogen enriched air 843 are increased, with a corresponding increase in the rate of warm up.

With reference now to FIG. 9, an illustration of an air separation module in an inert gas generation system is depicted in accordance with an illustrative embodiment. In this illustrative example, air separation module 900 is located within inert gas generation system 902. Air separation module 900 may be implemented using air separation module 400 in FIG. 4. Inert gas generation system 902 is an example of an implementation for inert gas generation system 208 in FIG. 2.

In this illustrative example, air separation module 900 has first input 904, first output 906, second output 908, and second input 910. Second input 910 is part of flow control system 911 for air separation module 900.

Inert gas generation system 902 also includes heat exchanger 912, filter 914, and distribution system 916.

Pipe 918 receives air 919 and is connected to heat exchanger 912. Pipe 920 connects heat exchanger 912 to filter 914. Pipe 922 connects filter 914 to first input 904. Air 919 that flows into first input 904 is first air 923.

Pipe 926 connects first output 906 of air separation module 900 to valve 928. Valve 928 is a two-way valve in this illustrative example. Pipe 930 is connected to valve 928 and second input 910. Pipe 932 is connected to valve 928 and distribution system 916. Pipe 934 is connected to pipe 932. Pipe 934 has low flow orifice 935.

In these illustrative examples, valve 936 is associated with pipe 918. Valve 938 is associated with pipe 932.

During warm up of air separation module 900, valve 928 may be positioned such that nitrogen enriched air 940 flowing out of first output 906 is directed to flow through pipe 930 into second input 910 as second air 942. When the warm up of air separation module 900 has completed, valve 938 may then direct nitrogen enriched air 940 flowing out of first output 906 into distribution system 916.

With reference now to FIG. 10, an illustration of an air separation module in an inert gas generation system is depicted in accordance with an illustrative embodiment. Air separation module 1000 is located in inert gas generation system 1002. Air separation module 1000 may be implemented using air separation module 400 in FIG. 4.

In this illustrative example, air separation module 1000 has first input 1004, first output 1006, second output 1008, and second input 1010 in flow control system 1011.

Inert gas generation system 1002 also includes heat exchanger 1012, filter 1014, and distribution system 1016. Pipe 1018 is connected to heat exchanger 1012 and receives air 1019. Pipe 1020 connects heat exchanger 1012 to filter 1014. Pipe 1022 connects filter 1014 to first input 1004 in air separation module 1000. Air 1019 flowing into first input 1004 is first air 1023. Pipe 1024 connects first output 1006 of air separation module 1000 to distribution system 1016. Pipe 1026 is connected to pipe 1024 and second input 1010 in air separation module 1000. Pipe 1028 is connected to pipe 1024.

Valve 1030 is associated with pipe 1018. Valve 1032 is associated with pipe 1026. Valve 1034 is associated with pipe 1024.

During warm up of air separation module 1000, valve 1032 may be open and valve 1034 may be closed to cause a flow of nitrogen enriched air 1035 from first output 1006 to be second air 1037 input into second input 1010. After air separation module 1000 has been heated to a desired operating temperature, valve 1032 may be closed, and valve 1034 may be in an open position. When valve 1034 is closed, nitrogen enriched air 1035 still flows to distribution system 1016 through pipe 1028.

Pipe 1028 reduces the flow of nitrogen enriched air 1035 when valve 1034 is in a closed position. The flow of nitrogen enriched air 1035 is reduced by low flow orifice 1029.

Figure 11:
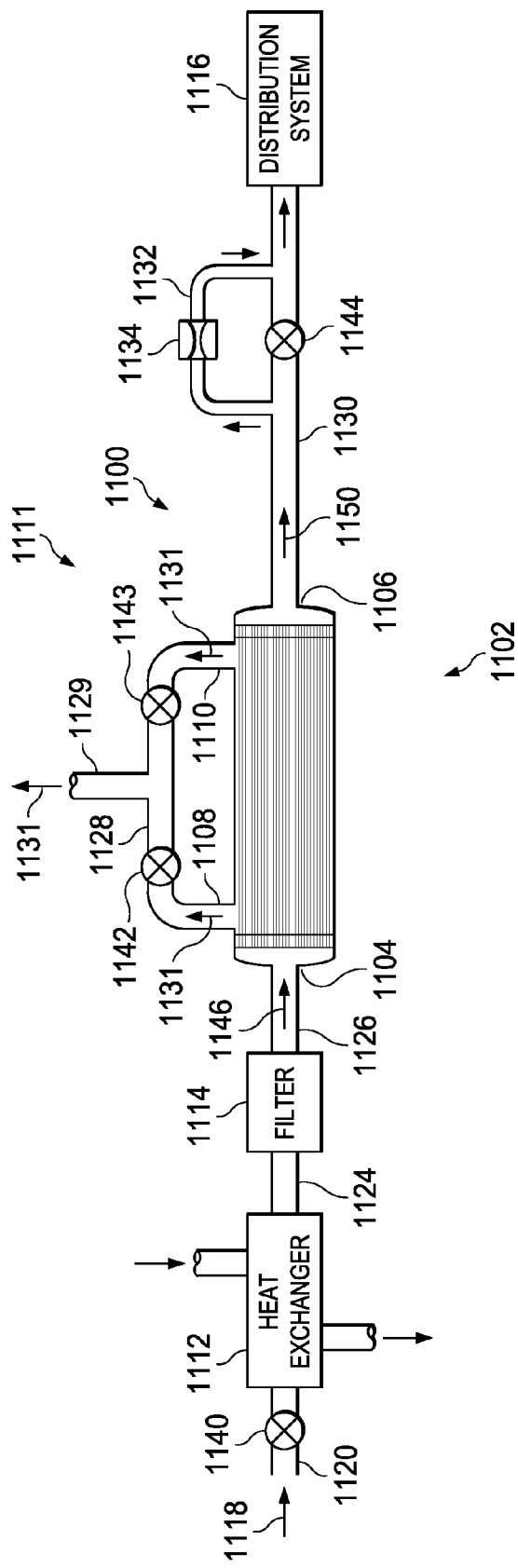
FIG. 11 is an illustration of an air separation module in an inert gas generation system in accordance with an illustrative embodiment.

With reference now to FIG. 11, an illustration of an air separation module in an inert gas generation system is depicted in accordance with an illustrative embodiment. In this illustrative example, air separation module 1100 is located in inert gas generation system 1102. Air separation module 1100 may be implemented using air separation module 400 in FIG. 4 and may be an example of an implementation for air separation module 300 in FIG. 3.

In this illustrative example, air separation module 1100 has first input 1104, first output 1106, second output 1108, and third output 1110 in flow control system 1111. Inert gas generation system 1102 includes heat exchanger 1112, filter 1114, and distribution system 1116.

In this illustrative example, air 1118 flows through pipe 1120 into heat exchanger 1112. Cooling air may flow through heat exchanger 1112 to cool air 1118 to a desired temperature. Air 1118 flows from heat exchanger 1112 through pipe 1124. Air 1118 then flows into air separation module 1100 through first input 1104 via a connection from filter 1114 to first input 1104 by pipe 1126.

As depicted, pipe 1128 is connected to second output 1108 and third output 1110. Pipe 1128 also has output 1129 through which oxygen enriched air 1131 may flow.

First output 1106 of air separation module 1100 is connected to pipe 1130, which is also connected to pipe 1132 before being connected to distribution system 1116. Pipe 1132 has low flow orifice 1134, which is configured to reduce a flow of air through pipe 1132.

In these illustrative examples, valve 1140 is located in pipe 1120. Valve 1142 and valve 1143 are located in pipe 1128. Valve 1144 is located in pipe 1130. Valve 1140 may be in an open position or a closed position to control the amount of air 1118 that flows to air separation module 1100. The portion of air 1118 that flows through first input 1104 is first air 1146.

Valve 1142 may be in an open or closed position to control the amount of oxygen enriched air 1131 that exits from second output 1108. Valve 1143 may be in an open or closed position to control the amount of oxygen enriched air 1131 that exits third output 1110. Valve 1144 controls the amount of nitrogen enriched air 1150 that flows into distribution system 1116.

During warm up of air separation module 1100, valve 1140 is in an open position. Valve 1142 is in a closed position, and valve 1143 is in an open position.

In these illustrative examples, valve 1144 may be in an open position or a closed position during the warm up of air separation module 1100. Valve 1144 may be in a closed position to reduce the flow of nitrogen enriched air 1150 with an undesired quality produced before warm up through pipe 1130 that enters the fuel tank system through distribution system 1116. Valve 1144 may be in an open position to increase the flow of first air 1146 into nitrogen enriched air 1150 through air separation module 1100 to increase the warming rate.

Placing valve 1144 in a closed position does not shut off the flow of nitrogen enriched air 1150 from first output 1106 but reduces the flow. When valve 1144 is in a closed position, nitrogen enriched air 1150 output from first output 1106 flows through pipe 1132 at a reduced rate as compared to flowing through pipe 1130. When air separation module 1100 has reached a desired operating temperature, valve 1142 is moved to an open position, and valve 1143 is moved to a closed position.

In these illustrative examples, the addition of third output 1110 in flow control system 1111 controls the flow of first air 1146 through air separation module 1100 in a manner that results in air separation module 1100 warming up more quickly than if third output 1110 was not present or used. For example, the flow of oxygen enriched air 1131 within air separation module 1100 to provide the flow of oxygen enriched air 1131 through second output 1108 and the flow of oxygen enriched air 1131 through third output 1110 in a manner that increases a rate at which air separation module 1100 warms up to a desired temperature to generate nitrogen enriched air 1150 at first output 1106. With the use of third output 1110, more of oxygen enriched air 1131 may flow through the length of air separation module 1100 than if valve 1143 is closed and prevents oxygen enriched air 1131 from flowing through third output 1110.

Figure 12:
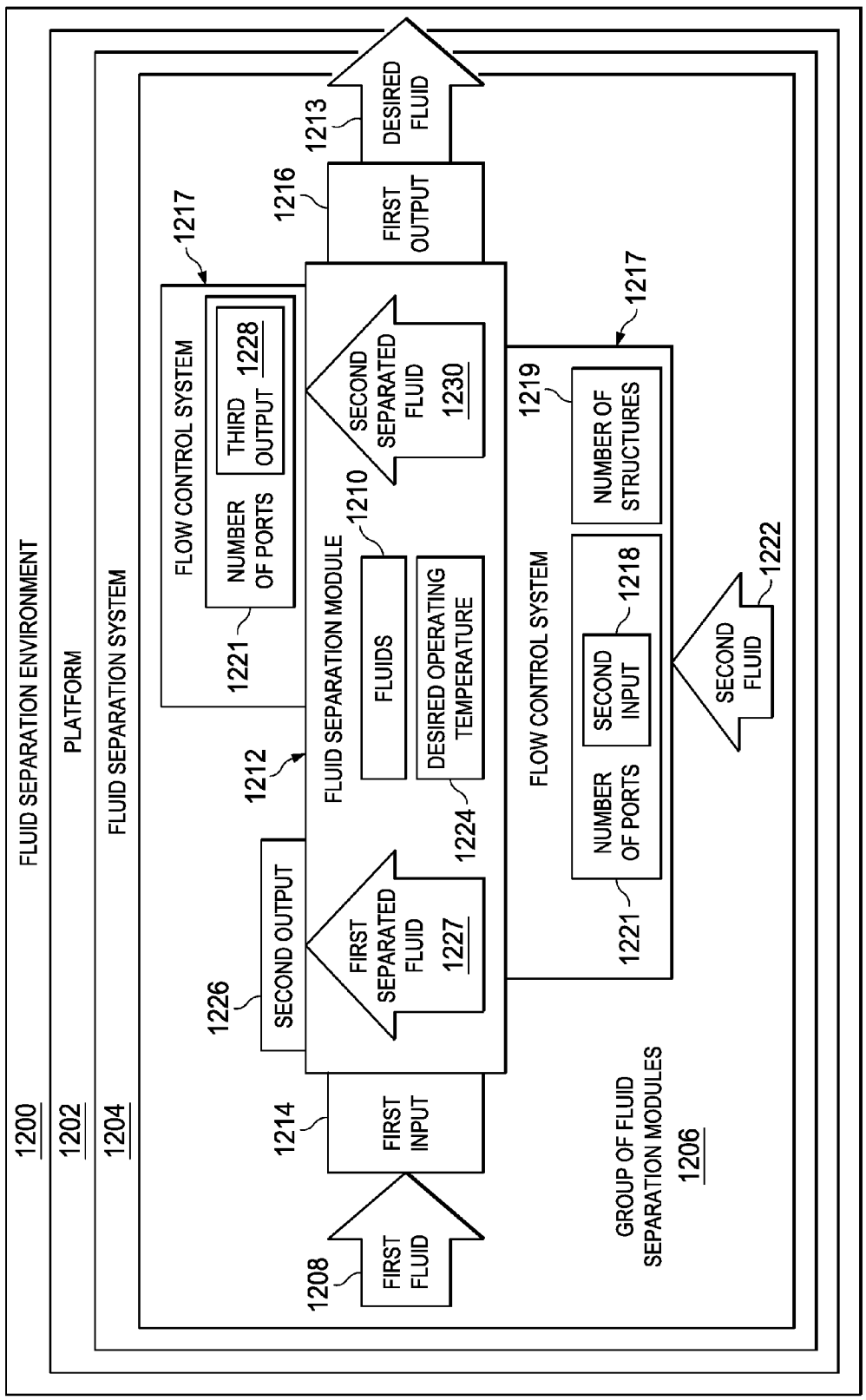
FIG. 12 is an illustration of a block diagram of a fluid separation environment in accordance with an illustrative embodiment.

Turning now to FIG. 12, an illustration of a block diagram of a fluid separation environment is depicted in accordance with an illustrative embodiment. In this illustrative example, platform 1202 in fluid separation environment 1200 has fluid separation system 1204. Fluid separation system 1204 includes group of fluid separation modules 1206. Group of fluid separation modules 1206 may be configured to separate first fluid 1208 into fluids 1210. In these illustrative examples, first fluid 1208 may be a heated fluid.

Fluid separation module 1212 is an example of a fluid separation module in group of fluid separation modules 1206. Fluid separation module 1212 is configured to output desired fluid 1213.

Fluid separation module 1212 has first input 1214, first output 1216, and flow control system 1217. Flow control system 1217 includes number of ports 1221. Number of ports 1221 are in fluid separation module 1212. As depicted, number of ports 1221 include at least one of second input 1218 and third output 1228 in these illustrative examples. Flow control system 1217 also may include number of structures 1219. These structures may be associated with second input 1218. Flow control system 1217 is configured to control a flow of fluids 1210 in fluid separation module 1212. The control of the flow of fluids 1210 in fluid separation module 1212 is configured to increase a rate at which fluid separation module 1212 reaches desired operating temperature 1224.

As depicted, first fluid 1208 is sent into first input 1214. Desired fluid 1213 is output through first output 1216 in these illustrative examples. Second input 1218 is configured to receive second fluid 1222. Second fluid 1222 is a heated fluid in this illustrative example. Second input 1218 in flow control system 1217 is configured to cause second fluid 1222 to become separated into fluids 1210 and flow within fluid separation module 1212 in a manner that increases a rate at which fluid separation module 1212 reaches desired operating temperature 1224. In these illustrative examples, fluid separation module 1212 also may have second output 1226 in some illustrative examples through which first separated fluid 1227 may flow.

In some illustrative examples, flow control system 1217 also may include third output 1228. Second separated fluid 1230 may flow out of third output 1228. Third output 1228 may be configured to cause a flow of fluids 1210 within fluid separation module 1212 in a manner that increases a rate at which fluid separation module 1212 reaches desired operating temperature 1224.

The use of at least one of second input 1218 and third output 1228 may increase the area in which fluids 1210 flow in fluid separation module 1212. In other words, either second input 1218, third output 1228, or both may be used with fluid separation module 1212. In other words, the flow of fluids 1210 may be more even through fluid separation module 1212 with the use of flow control system 1217.

The illustration of an aircraft in FIG. 1 and components in an inert gas generation system in FIGS. 4-11 may be combined with components illustrated in FIGS. 2, 3, and 12, used with components in FIGS. 2, 3, and 12, or a combination of the two. Additionally, some of the components in FIGS. 1 and 4-11 may be illustrative examples of how components shown in block form in FIGS. 2, 3, and 12 can be implemented as physical structures.

With reference now to FIG. 13, an illustration of a flowchart of a process for processing air in an inert gas generation system is depicted in accordance with an illustrative embodiment. This process may be implemented in air separation module 300 in FIG. 3.

The process begins by sending first air into a first input in an air separation module (operation 1300). The first air may be first air 322 in FIG. 3. The air separation module is configured to generate nitrogen enriched air from the first air. Second air is sent into a second input for a flow control system for the air separation module (operation 1302). The flow control system may be flow control system 338, and the second air may be second air 334 in FIG. 3. In these illustrative examples, the flow control system also may include a number of structures associated with the second input.

The process then increases a rate at which the air separation module reaches a desired operating temperature from the flow of the second air in the air separation module (operation 1304), with the process terminating thereafter.

In these illustrative examples, the flow of the first air, the oxygen enriched air, and the nitrogen enriched air within the air separation module causes the air separation module to reach the desired operating temperature more quickly than without the second air.

Figure 14:
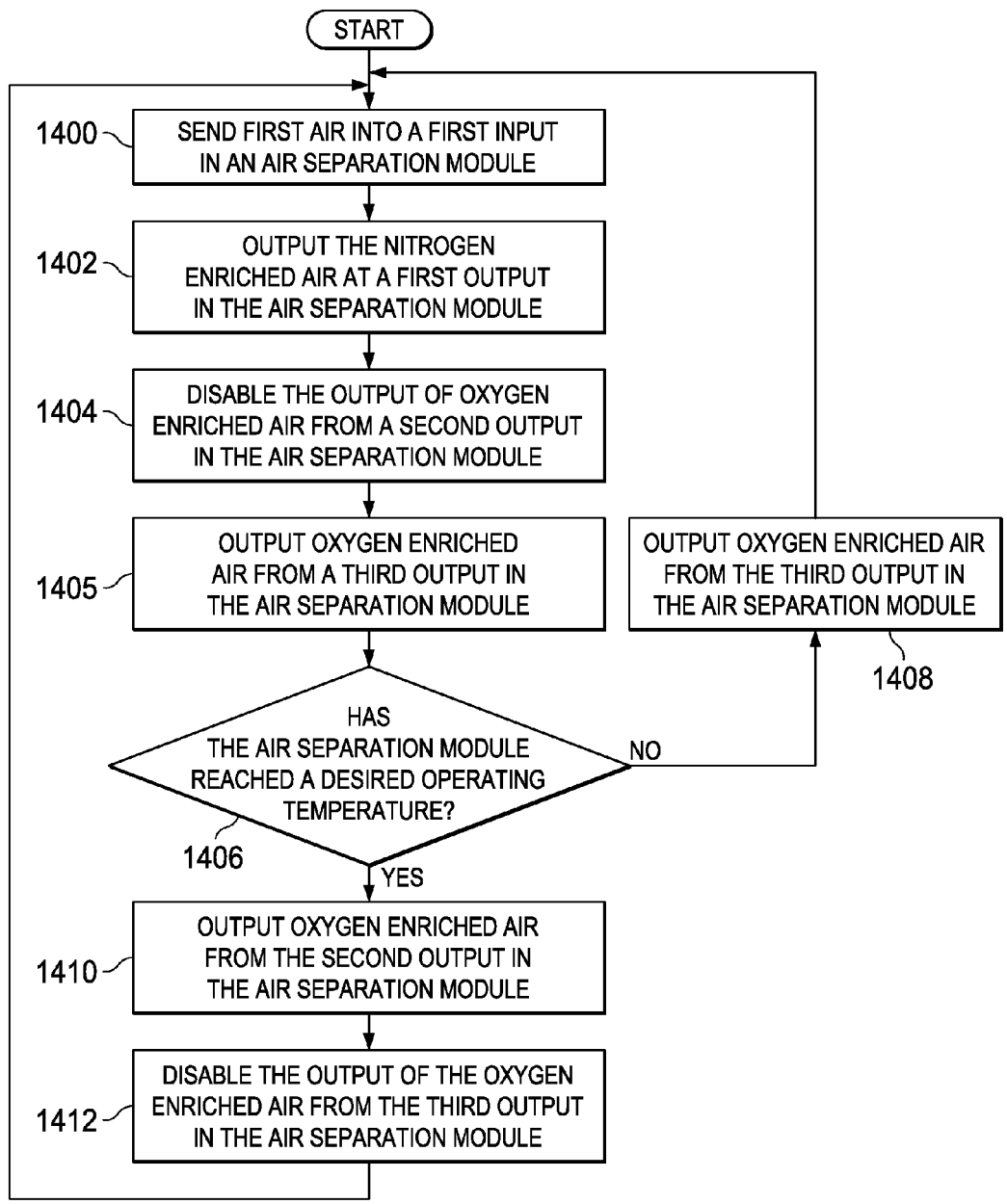
FIG. 14 is an illustration of a flowchart of a process for processing air in an inert gas generation system in accordance with an illustrative embodiment.

With reference now to FIG. 14, an illustration of a flowchart of a process for processing air in an inert gas generation system is depicted in accordance with an illustrative embodiment. This process may be implemented in air separation module 300 in FIG. 3. This process may be implemented using a number of ports associated with the air separation module. In these illustrative examples, the number of ports may be, for example, at least one of second input 332 and third output 341 in flow control system 338 in FIG. 3. In other words, one or both of these ports may be used in the illustrative examples.

The process begins by sending first air into a first input in an air separation module (operation 1400). The first air may be first air 322 in FIG. 3. The air separation module is configured to generate nitrogen enriched air from the first air. The process outputs the nitrogen enriched air at a first output in the air separation module (operation 1402). The nitrogen enriched air may be nitrogen enriched air 324 in FIG. 3.

The process disables the output of oxygen enriched air from a second output in the air separation module (operation 1404) and outputs oxygen enriched air from a third output in the air separation module (operation 1405). The second output may be second output 320, and the third output may be third output 341 in FIG. 3. The oxygen enriched air may be oxygen enriched air 326 in FIG. 3. The oxygen enriched air is a separated air generated from separating the nitrogen enriched air from the first air.

A determination is made as to whether the air separation module has reached a desired operating temperature (operation 1406). This determination may be made based on one or more of temperature measurement, oxygen concentration measurement of the nitrogen enriched air, oxygen concentration measurement of the oxygen enriched air, a predetermined warm-up time, a warm-up time that is a function of ambient temperature, flow rate measurement of the oxygen enriched air, flow rate measurement of the inlet air, or other suitable factors.

If the air separation module has not reached a desired operating temperature, the process outputs oxygen enriched air from the third output in the air separation module (operation 1408), with the process returning to operation 1400. In these illustrative examples, the third output is a component in a flow control system that is used when warming up the air separation module to a desired operating temperature. A third output may be disabled when the air separation module reaches a desired operating temperature.

With reference again to operation 1406, if the air separation module has reached the desired operating temperature, the process outputs the oxygen enriched air from second output in the air separation module (operation 1410) and disables the output of the oxygen enriched air from the third output in the air separation module (operation 1412), with the process returning to operation 1400.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Although the different illustrative examples have been described with respect to separating air to form an inert gas, the different illustrative embodiments may be applied to other types of fluid separation systems other than those for separating air into oxygen enriched air and nitrogen enriched air.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. For example, air separation modules may be manufactured in accordance with an illustrative embodiment to include a flow control system.

As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. Air separation modules manufactured in accordance with an illustrative embodiment may be added to an inert gas generation system already present in an aircraft while aircraft 1600 is in service 1512 or in maintenance and service 1514. Further, an air separation module in accordance with an illustrative embodiment may be used as part of an upgrade or refurbishment of an aircraft when an inert gas generation system is added to the aircraft.

Thus, the different illustrative embodiments may reduce the time needed for an air separation module to warm up to a desired operating temperature. The different illustrative embodiments employ a flow control system that changes the flow of air through an air separation module that causes the air separation module to warm up more quickly than without the flow control system. In these illustrative examples, a second air is input into the air separation module in addition to the first air normally input into the air separation module. The second air is input in a location that allows for more of the permeable membranes in the hollow fibers to be exposed to more airflow of at least one of the first air and one of the second air.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an air separation module configured to generate an inert gas;
   a first input for the air separation module, wherein the first input is configured to receive first air;
   a first output for the air separation module, wherein the first output is configured to output the inert gas from the air separation module;
   a second output for the air separation module, wherein the second output is configured to output separated air from the air separation module;
   a flow control system configured to control a flow of air in the air separation module that increases a rate at which the air separation module is warmed to a desired operating temperature for generating the inert gas using a number of ports in the air separation module, the number of ports comprising a second input for the air separation module, the second input configured to receive second air from a heating source; and
   a pipe downstream from the first output, the pipe configured to divert at least a portion of the inert gas to the air separation module.

2. The apparatus of claim 1, wherein the second input is configured to increase the rate at which the air separation module is warmed to reach the desired operating temperature.

3. The apparatus of claim 1, wherein the number of ports in the flow control system comprises:
   a third output for the air separation module wherein the third output is configured to output the separated air and the third output is configured to increase the rate at which the air separation module reaches the desired operating temperature.

4. The apparatus of claim 1, wherein the number of ports in the flow control system further comprises:
   a third output for the air separation module wherein the third output is configured to output the separated air and the third output is configured to increase the rate at which the air separation module reaches the desired operating temperature.

5. The apparatus of claim 1, wherein the first input is located at a first end of the air separation module and the first output is located at a second end of the air separation module.

6. The apparatus of claim 1, wherein the second input is located on the air separation module in a first location that is downstream to a second location of the second output.

7. The apparatus of claim 1, wherein the flow control system further comprises:
   a number of structures associated with the second input, wherein the second input and the number of structures are configured to control a flow of the second air such that the rate at which the air separation module reaches the desired operating temperature increases.

8. The apparatus of claim 6, wherein the second air into the second input causes a flow of the second air upstream toward the second output in the air separation module.

9. The apparatus of claim 1, wherein a source supplies the first air and the second air.

10. The apparatus of claim 1, wherein a source supplies the first air and wherein the second air is a portion of the inert gas output from the first output.

11. The apparatus of claim 1 further comprising:
   a valve associated with the pipe, wherein the valve is configured to be open while a temperature of the air separation module increases toward the desired operating temperature for the air separation module.

12. The apparatus of claim 11, wherein the pipe is connected to the second input.

13. The apparatus of claim 1, wherein the inert gas is nitrogen enriched air and the separated air is oxygen enriched air, and the air separation module comprises:
   a housing with a chamber; and
   a separation system configured to separate the first air into the oxygen enriched air and the nitrogen enriched air.

14. The apparatus of claim 13, wherein the separation system comprises:
   a plurality of hollow fibers configured to separate the first air into the oxygen enriched air and the nitrogen enriched air, wherein the nitrogen enriched air flows out of the first output and the oxygen enriched air flows out of the second output.

15. An apparatus comprising:
   a fluid separation module configured to generate a desired fluid from a first fluid;
   a first input for the fluid separation module, wherein the first input is configured to receive the first fluid;
   an output for the fluid separation module, wherein the output is configured to output the desired fluid;
   a flow control system configured to control a flow of fluids in the fluid separation module that increases a rate at which the fluid separation module is warmed to a desired operating temperature for generating the desired fluid using a number of ports in the fluid separation module, the number of ports comprising a second input for the fluid separation module, the second input configured to receive a second fluid from a heating source; and
   a pipe downstream from the output, the pipe configured to divert at least a portion of the desired fluid to the fluid separation module.

16. The apparatus of claim 15, wherein a flow of the second fluid in the fluid separation module is configured to increase the rate at which the fluid separation module is warmed to reach the desired operating temperature for generating the desired fluid.

17. The apparatus of claim 15, wherein the fluid separation module is an air separation module having a plurality of hollow fibers with a permeable membrane, the first fluid is air, the second fluid is oxygen enriched air, and the desired fluid is nitrogen enriched air.

* * * * *